United States Patent
Andrews

(10) Patent No.: US 10,247,008 B2
(45) Date of Patent: Apr. 2, 2019

(54) FAN BLADE

(71) Applicant: ROLLS-ROYCE plc, London (GB)

(72) Inventor: Ian Andrews, Derby (GB)

(73) Assignee: ROLLS-ROYCE plc, London (GB)

(*) Notice: Subject to any disclaimer, the term of this patent is extended or adjusted under 35 U.S.C. 154(b) by 475 days.

(21) Appl. No.: 14/971,198

(22) Filed: Dec. 16, 2015

(65) Prior Publication Data

US 2016/0208617 A1 Jul. 21, 2016

(30) Foreign Application Priority Data

Jan. 15, 2015 (GB) .................... 1500605.9

(51) Int. Cl.
| | |
|---|---|
| *F01D 5/14* | (2006.01) |
| *F01D 5/18* | (2006.01) |
| *F01D 5/28* | (2006.01) |
| *B23P 15/04* | (2006.01) |

(52) U.S. Cl.
CPC ............. *F01D 5/18* (2013.01); *B23P 15/04* (2013.01); *F01D 5/147* (2013.01); *F01D 5/282* (2013.01); *F05D 2230/236* (2013.01); *F05D 2300/701* (2013.01)

(58) Field of Classification Search
None
See application file for complete search history.

(56) References Cited

U.S. PATENT DOCUMENTS 5,253,419 A * 10/1993 Collot .................. B21D 26/055
29/889.72

FOREIGN PATENT DOCUMENTS

| EP | 1 995 411 A2 | 11/2008 | |
|---|---|---|---|
| EP | 2 014 384 A1 | 1/2009 | |
| EP | 2 014 386 A1 | 1/2009 | |
| EP | 2 233 239 A2 | 9/2010 | |
| EP | 2 273 069 A2 | 1/2011 | |
| EP | 2 423 441 A2 | 2/2012 | |
| FR | 2 698 126 A1 | 5/1994 | |
| GB | 2147055 A * | 5/1985 | ............. F01D 5/282 |

OTHER PUBLICATIONS

Jun. 17, 2015 Search Report issued in British Patent Application No. 1500605.9.
Jun. 21, 2016 Search Report filed in European Patent Application No. 15200478.

* cited by examiner

Primary Examiner — Woody A Lee, Jr.
Assistant Examiner — Jason A Fountain
(74) Attorney, Agent, or Firm — Oliff PLC

(57) ABSTRACT

A turbomachine fan blade preform (10) comprising a pair of mutually opposing panels (12), and a membrane (20) sandwiched between the pair of panels (12). The membrane (20) is of a non-uniform thickness. The thickness of at least a portion of the membrane tapers along its length and/or width, between a relative thicker first region and relatively thinner second region.

13 Claims, 3 Drawing Sheets

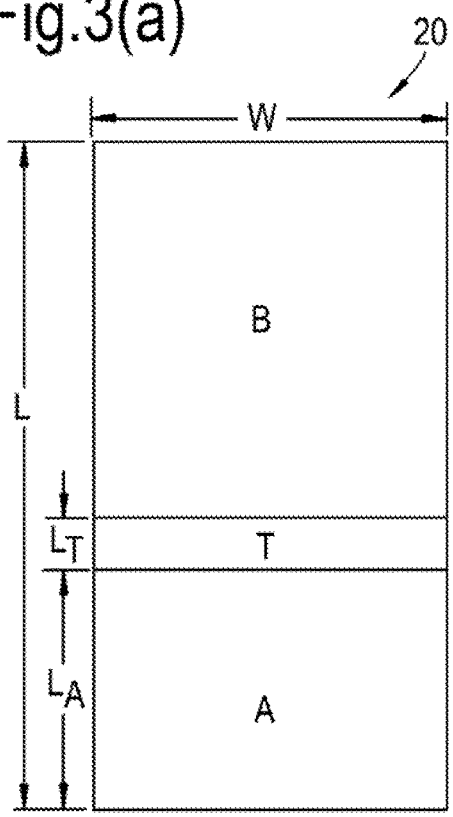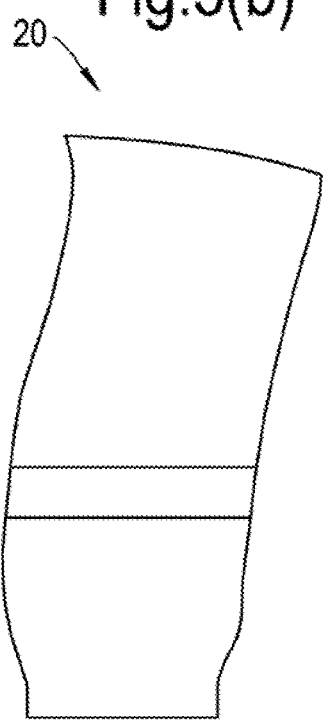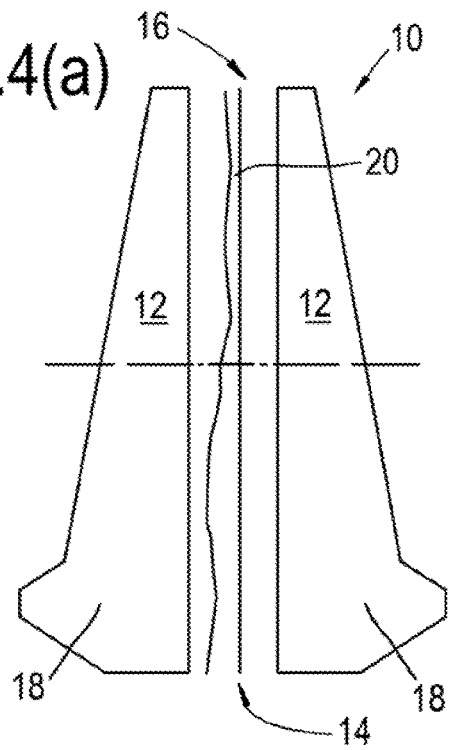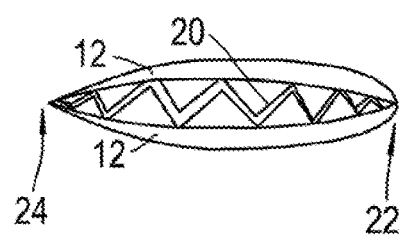

FAN BLADE

FIELD OF THE INVENTION

The present invention relates to fan blades for turbomachines. In particular, but not exclusively, it relates to improved fan blades for gas turbine engines and a method of manufacture thereof.

BACKGROUND

Diffusion bonded-superplastically formed line core hollow titanium fan blades are known in the prior art. The current design for a preform assembly for a wide chord fan blade (WCFB) comprises two opposing panels 2 sandwiching a membrane 3 onto which an internal core pattern is (e.g. silk-screen) printed—a general example of the preform assembly 1 is shown in FIG. 1(a), and a cross section of a final fan blade based on the preform of FIG. 1(a) is shown in FIG. 1(b), the cross-section being taken at the dashed line of FIG. 1(a) (but in the final fan blade rather than the preform assembly).

The two opposing panels 2 are typically first welded together e.g. at their edges, and the resulting assembly is diffusion bonded into a flat pack.

Then the assembly is heated through hot forming and an inert gas is injected between the two sheets, to inflate the assembly to form an internal cavity. The membrane, which is bonded to the titanium panels at the silk-printed locations, stretches by superplastic forming under the force exerted by the gas under a temperature greater than 900 degrees Celsius, typically generating a concertina type structure between the two panels in the internal cavity, as shown in FIG. 1(b) in cross section (taken at the dashed line in FIG. 1(a)).

Once the membrane has taken its final shape, the inert gas is removed; a vacuum being created between the two panels 2 to prevent any water contamination thanks to the pressure differential. The panels extend between a tip portion 4 and a root portion 5, for example as indicated in the preform assembly 1 in FIG. 1(a).

The superplastic membrane, which may take the form of an arrangement of prisms, forms the internal line-core of the blade and offers a strong resistance to stress and centrifugal force. An example of a cross-section of such a blade (post-production) is shown in FIG. 1(b) (looking from tip to root), showing the leading-edge 6 and the trailing edge 7 of the blade.

SUMMARY OF THE DISCLOSURE

In an aspect, the present invention aims to provide a more lightweight fan blade than the prior art. This results in a cost reduction in the manufacturing process. It also results in a more efficient turbomachine, which results in reduced energy requirements, e.g. a reduction in fuel consumption when operating the turbomachine.

Accordingly, the present invention provides a fan blade pre-form assembly as set forth in claim 1.

The thickness of at least a portion of the membrane tapers along its length and/or width (breadth), between a relative thicker first region and relatively thinner second region.

Thus, the present invention provides a pre-form assembly which, when finalized according to typical subsequent processes, provides a fan blade which is more lightweight than prior art fan blades, but which retains suitable structural rigidity and/or suitable acoustic vibration characteristics.

The thickness of the membrane in the first region is greater than the thickness of the membrane in the second region by more than 10%, e.g. by more than 25% (of the thickness in the second region).

The panels of the preform are arranged to define a root region and a tip region of the final fan blade, and a leading edge region and a trailing edge region of the final fan blade. The membrane may extend between root and tip regions and may extend between the leading edge and trailing edge regions.

The first region of the membrane may be located proximate the root region. The second region of the membrane may be located distal to the root region.

The first region may extend between the root region and the tip region along a region of the membrane which is generally equidistant between the leading and trailing edges.

The second region may extend along at least a portion of the length of the first region, for example on one side of the first region, or on each respective side of the first region.

The first region may include a first sub-region extending along a generally central region of the membrane between the root region and the tip region; and may include a second sub-region extending laterally between the leading edge region and the trailing edge region.

The second sub-region may be closer to the root portion than to the tip region.

A tapered region may be provided at each border between the first and second regions. The thickness of the tapered region may be configured to provide a transition between the respectively different thicknesses of the first and second regions.

A surface of the membrane may be substantially planar, for planar engagement with a corresponding planar surface of a panel of said panels.

In another aspect, the present invention provides a method of manufacture of a fan blade for a turbomachine as set forth in the appended claims.

The method may include the steps of: providing a fan blade preform according to any aspect or embodiment of the invention described herein; performing a bonding process to bond the panels and the membrane at selected regions; performing a hot forming process on the fan blade preform to provide an internal cavity across which the membrane extends.

The bonding process may be a diffusion bonding process.

The hot forming process may be a superplastic forming process.

In yet another aspect, the present invention provides a fan blade for a turbomachine comprising: a pair of mutually opposing fan blade skins, arranged to extend between the leading and trailing edges of the fan blade and between the root and tip portions of the fan blade to define an internal cavity, an internal membrane spanning the cavity between the respective skins, and extending at least partway between the root and tip portions; wherein the thickness of the membrane is non-uniform.

For example, the thickness of at least a portion of the membrane may taper along its length between the root and tip portions, from a relative thicker first region to a relatively thinner second region.

Additionally, or alternatively, the thickness of at least a portion of the membrane may taper along its breadth spanning the cavity between the respective fan blade skins, from a relative thicker first region to a relatively thinner second region.

The thickness of the membrane in the first region is greater than the thickness of the membrane in the second region by more than 10%, e.g. by more than 25% (of the thickness in the second region).

BRIEF DESCRIPTION OF THE DRAWINGS

Embodiments will now be described by way of example with reference to the accompanying drawings in which:

FIG. 3(a) shows an example of a preform membrane;

FIG. 3(b) shows an example plan view of a membrane in a final blade;

FIG. 4(a) shows an exploded view of a fan blade preform;

FIG. 4(b) shows a cross section of a final fan blade based on the preform of FIG. 4(a), the cross-section being taken at the dashed line of FIG. 4(a) in the final fan blade;

DETAILED DESCRIPTION

Figure 1A:
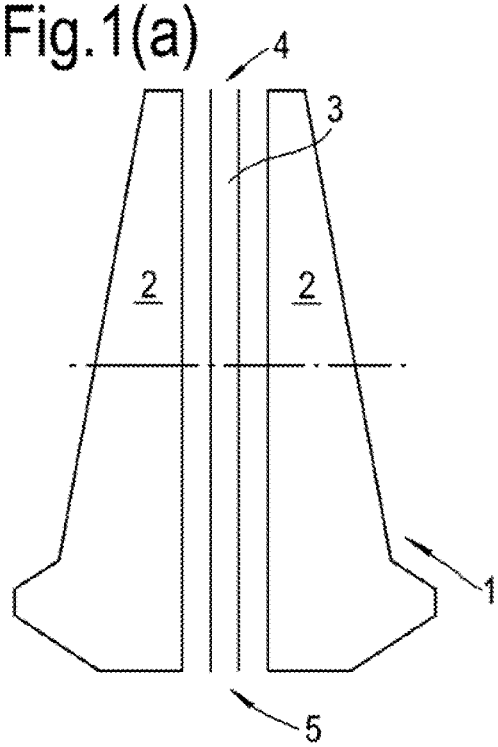
FIG. 1(a) shows an exploded view of a fan blade preform according to the prior art.
Figure 1B:
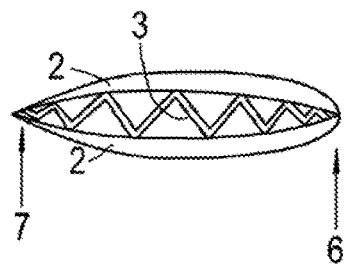
FIG. 1(b) shows a cross section of a final fan blade based on the preform of FIG. 1(a), the cross-section being taken at the dashed line of FIG. 1(a) in the final fan blade.
Figure 2A:
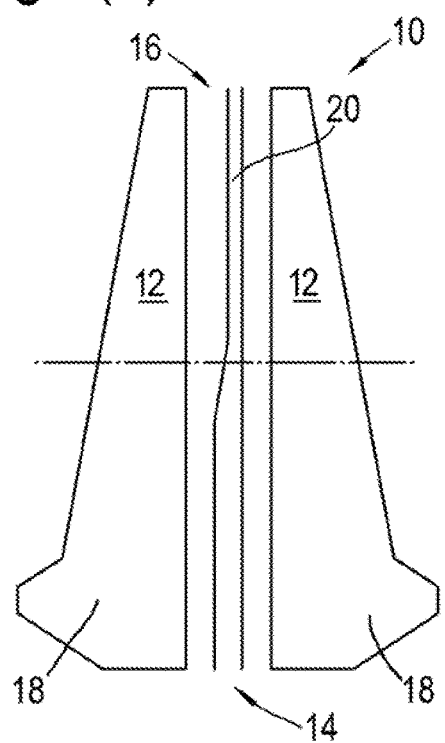
FIG. 2(a) shows an exploded view of a fan blade preform.

The present invention is particularly suited to providing improved fan blades for a turbomachine, such as a gas turbine engine. FIG. 2(a) shows an exploded view of the basic elements of a fan blade preform 10.

Preform 10 includes a pair of mutually opposing panels 12, which will eventually form the outer skin of the final fan blade. The panels 12 cooperate to provide a tip portion 16 and a root portion 14 of final fan blade. For ease of explanation, the root portion 14 and tip portion 16 are shown in FIG. 2(a) without excess, or surplus, material which may be present in the preform 10 when being worked in practice. Indeed, in practice, surplus material is typically present, and is machined or otherwise removed following the diffusion bonding and superplastic forming steps. The presence and removal of such surplus material will be omitted here for reasons of brevity and clarity of explanation.

On their respective outer surfaces, panels 12 may include structural features required in the final fan blade, for example root members 18 for securing the final fan blade into the hub of the fan in which the blade is to be incorporated. Root members 18 may not be in their final form in the preform, further manufacturing steps may be required to achieve the desired final form, for example machining or other processes.

Panels 12 of the preform 10 sandwich a membrane 20. However, unlike the prior art membranes, membrane 20 is of appreciable varying thickness. In particular, the thickness of the membrane preferably tapers.

The thickness preferably tapers along its length from the root portion of the preform 10 to the tip portion of the preform 10.

The taper may be present in only a portion of the length of the membrane. For example, the taper may provide a transition region between two regions of respectively different, but substantially uniform, thicknesses of the membrane. Alternatively, the entire length of the membrane between the root portion and tip portion of the preform 10 may taper. The taper may be linear, but it may be non-linear.

FIG. 3(a) shows an example of a membrane 20, which has three distinct thickness regions. FIG. 3(b) shows an example of the final form of the membrane 20 after the subsequent processing resulting in the final blade.

As can be seen from FIG. 3(a), the membrane 20 includes three respective thickness regions A, T, B.

The lowermost region A is intended to form the membrane 20, in the final blade cavity, relatively near to the root portion of the final blade. As an example, this region has a thickness of 1.27 mm.

The upper most region B is intended to form the membrane 20, in the final blade cavity, relatively near to the tip portion of the final blade. As an example, this region has a thickness of 0.711 mm, which is appreciably thinner than the lowermost region.

A region T of tapered thickness is shown between the lowermost and uppermost regions A, B. This region may be referred to as a taper region or a transition zone for example. The taper region provides a taper in the thickness of the membrane from the relatively thicker lowermost region, to the relatively thicker uppermost region.

Thus, as can be seen from FIG. 3(b) the region of the membrane which is proximal to the root portion of the final blade is thicker than the region of the membrane which is distal to the root portion of the final blade (and which is proximal to the tip region of the final blade). The taper region may be chosen to be generally in the mid-span position of the final blade.

By way of example only, the span length of the lowermost region A may be 20 to 40 percent of the total span length of the membrane 20. The region T may have a span length of less than 20 percent (e.g. less than 10 percent) of the total span length of the membrane. By way of example only, sample dimensions are now provided but as will be appreciated by the person skilled in the art the regions and membrane may have alternative suitable dimensions.

According to this example, the region of the blade which experiences relatively large stresses and centrifugal forces includes a suitably thick (and therefore strong) membrane to help withstand the forces. Whereas the region of the blade which experiences relatively smaller stresses and centrifugal forces can be made thinner (whilst nonetheless remaining suitably thick and strong enough to withstand the forces), thereby resulting in an advantageous weight reduction.

Figure 5A:
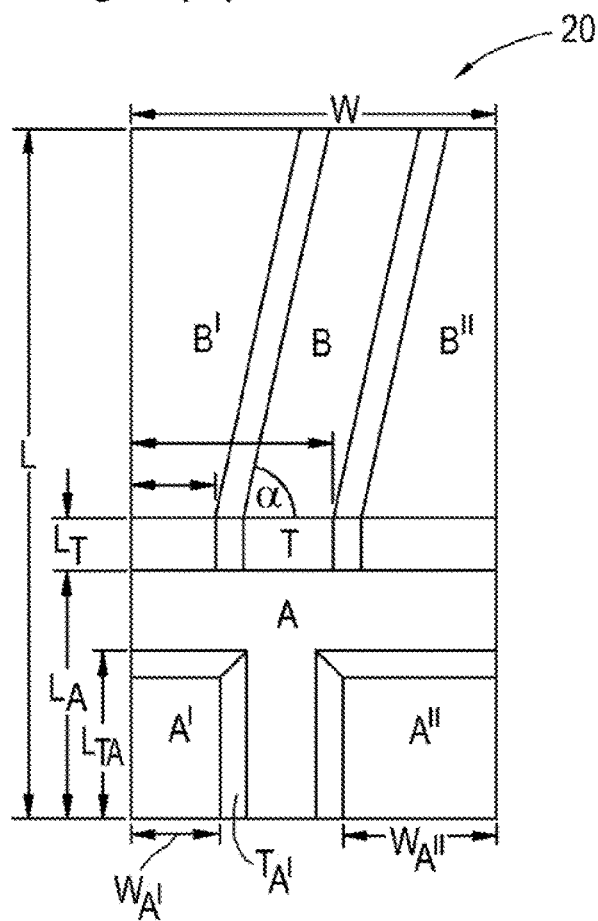
FIG. 5(a) shows an example of a preform membrane.

A more detailed example of a preform 10 and membrane 20 is shown in FIGS. 4 and 5, in which multiple taper regions are provided.

Similarly to the previous example, taper regions are provided between the root portion 14 and the tip 16 of the preform 10. However, in this example, taper regions are also provided in the membrane 20 in the width direction of the membrane, in other words between the respective regions of the membrane 20 which will reside near to the leading edge and near to the trailing edge of the final blade.

Figure 5B:
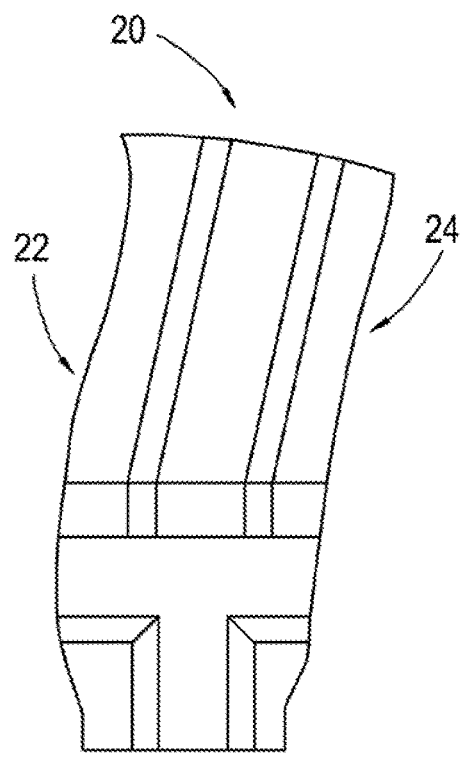
FIG. 5(b) shows an example plan view of a membrane in a final blade.
Figure 6:
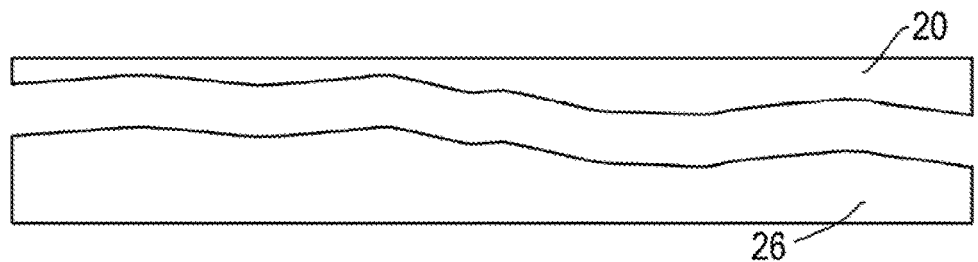
FIG. 6 shows a simplified example of a method of producing a membrane of non-uniform thickness.

The leading edge 22 and the trailing edge 24 of the final blade are shown in FIG. 4(b) for example, and are also indicated in FIG. 5(b) for convenience of reference.

Accordingly, a fan blade may include an internal membrane in the blade cavity, which varies in thickness in at least one of, but preferably both, the radial and chord-wise directions of the final blade.

Therefore, the regions of the membrane which are likely to experience in use relatively larger stresses and forces (than other regions) can be made relatively thicker than regions which experience in use relatively smaller (weaker) stresses and forces.

The detailed example shown in FIG. 5 has been demonstrated to achieve approximately a 300 g weight saving over the prior art fan blades. In the example shown in FIG. 5, there are multiple regions of differing thickness and multiple transition regions. Similar to the previously described example, there is a lowermost region A, an uppermost region B and a transition region T between the lowermost and uppermost regions. In the lowermost region A, there is a region A' in one lower corner and a region A" in the opposite lower corner, and a respective transition region $T_A'$ and $T_A''$ is provided between the region A' and A" and the remainder of the region A. In the uppermost region B a region B' is provided at one chordwise side and a region B" is provided at an opposite chordwise side, so as to create a central region that is angled to a chordwise direction of the membrane by an angle α. A respective transition region $T_B'$ and $T_B''$ is provided between the regions B' and B" and the remainder of the region B.

By way of example only the dimensions for the membrane are provided, but it is understood by the person skilled in the art that these dimensions are example dimensions. The membrane may have a spanwise length L, and the length $L_A$ of the region A may be 20 to 40 percent of the total length L, and the length $L_T$ of the region T may be 20 to 40 percent of the total length L. The region A' and the transition region $T_A'$ may have a total combined length of 30 to 50 percent, for example 40 percent, of the total length $L_A$ of the region A. The region A' may have a width $W_{A'}$ equal to or less than 50 percent of the total width W of the membrane. The region A" and the transition region $T_A''$ may have a total combined length $L_{TA}$ of 30 to 50 percent, for example 40 percent, of the total length $L_A$ of the region A. The region A" may have a width $W_{A''}$ equal to or less than 50 percent of the total width W of the membrane. The thickness of the region A may be approximately 1.3 mm, the thickness of the region A' may be approximately 0.6 mm, and the thickness of the region A" may be approximately 0.6 mm. The angle α may be approximately 70 to 80°. The thickness of the region B may be approximately 0.7 mm, the thickness of the region B' may be approximately 0.6 mm, and the thickness of the region B" may be approximately 0.6 mm.

A membrane 20 of varying thickness may be provided by etching a membrane of uniform thickness. Alternatively, a process known as flash grinding may be used. In flash grinding a fixture is supplied which is surface patterned according to a mirror image of the desired pattern for the membrane 20. A blank membrane, e.g. of uniform thickness, is overlaid on the fixture 26 and urged to conform to the patterned surface of the fixture. Whilst in place, the reverse (upper side) of the membrane is ground flat.

Thus, the membrane 20 is typically formed to have a contoured, e.g. tapered, side and a flat or planar side. Flash grinding typically provides a tolerance of approximately 0.05 mm, which is sufficient for the present disclosure.

The fixture 26 may be metallic. However, a metallic fixture will wear and it is expensive to replace a metallic fixture. Hence, it is preferred that the fixture is formed of e.g. ice, which is quick and inexpensive to provide.

The method of processing a fan blade preform incorporating a membrane of non-uniform thickness is generally similar to the prior art but is distinguished therefrom as discussed below, for example.

In general, a pair of mutually opposing panels 12, e.g. similar to the prior art panels, are provided to sandwich membrane 20.

The inwardly facing surfaces of the mutually opposing panels 12 (and/or the membrane 20) are printed with a suitable stop-off material such as yttrium to inhibit bonding in the region of the stop-off material in the subsequent bonding step.

The preform 10 is subject to a bonding process, for example a diffusion bonding process similar to the prior art, to form an integral fan blade preform 10 comprising at least the pair of panels 12 bonded with the membrane 20. Prior to the bonding process, the preform 10 may be referred to as an assembly. After the bonding process, the preform 10 may be referred to as an integral preform, or a preform body.

Figure 2B:
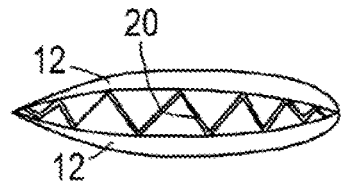
FIG. 2(b) shows a cross section of a final fan blade based on the preform of FIG. 2(a), the cross-section being taken at the dashed line of FIG. 2(a) in the final fan blade.

Subsequently, the integral preform is subject to a hot forming process, for example a superplastic forming process similar to the prior art, to generate the internal cavity between the panels 12 and to superplastically form the membrane into the concertina type membrane extending between the panels, e.g. as shown in FIGS. 2 and 4. However, the membrane will have a non-uniform, e.g. a tapered, thickness in one of, or both, the radial and chordwise directions.

In the hot forming process, the integral preform 10 is typically placed in a cavity die, and is subject to suitable temperatures and pressures to inflate the preform 10 to conform it to the internal dimensions of the cavity die.

Similarly to the prior art, the stop-off material is printed (patterned) to prevent bonding of the membrane with each of the panels so as to achieve the desired structure or form of the membrane 20 within the blade cavity.

The membrane may be contoured on only one side, and planar on the other. Or, both sides of the membrane may be contoured. In any event, during the diffusion bonding process, the panels 12 conform to the membrane to form an interface suitable for the diffusion bonding process to result in the desired bond between the panels and membranes in the interface regions where the stop-off material is not provided.

The panels 12 and the membrane 20 may be formed of titanium.

Where the membrane is formed of titanium, the large area required (which may be 1-2 $m^2$ or more) means that the membrane 20 cannot be provided thinner than 0.5 mm and still readily withstand being handled and subject to processes such as hot forming processes and diffusion bonding processes. Furthermore, on such large area membranes, the manufacturing tolerances are typically approximately 0.05 mm.

However, a membrane may be formed such that the thickness of at least a portion of the membrane 20 tapers along its length and/or width, between a relative thicker first region and relatively thinner second region, wherein the thickness of the membrane 20 in the first region is greater than the thickness of the membrane in the second region for example by more than 10%, 15%, 20%, 25%, 30%, 35%, 40%, 45%, 50%, 55%, 60%, 65%, 70%, 75%, 80%, 85%, 90%, 95% or even 100% of the thickness in the second region.

In particular, the region of the membrane which is proximal to the root portion of the final blade has an average thickness which is greater than the region of the membrane which is distal to the root portion of the final blade (and for example which is proximal to the tip region of the final blade). The average thickness of the membrane 20 which is proximal to the root portion of the final blade is greater than the average thickness of the membrane which is distal to the root portion of the final blade for example by more than 10%, 15%, 20%, 25%, 30%, 35%, 40%, 45%, 50%, 55%, 60%, 65%, 70%, 75%, 80%, 85%, 90%, 95% or even 100% of the thickness in the second region.

The invention claimed is:

1. A turbomachine fan blade preform comprising:
   a pair of mutually opposing panels; and
   a membrane sandwiched between the pair of panels, wherein:
   the thickness of at least a portion of the membrane tapers along its length and/or width, between a relatively thicker first region and relatively thinner second region, and
   the thickness of the membrane in the first region is greater than the thickness of the membrane in the second region by more than 10% of the thickness in the second region,
   the panels of the preform are arranged to define a root region and a tip region of a final fan blade, and a leading edge region and a trailing edge region of the final fan blade, the membrane extends between root and tip regions and between the leading edge and trailing edge regions, and
   the first region of the membrane is located proximate the root region, and the second region of the membrane is located distal to the root region.

2. The turbomachine fan blade preform according to claim 1 wherein the thickness of the membrane in the first region is greater than the thickness of the membrane in the second region by more than 25% of the thickness in the second region.

3. The turbomachine fan blade preform according to claim 1 wherein the first region extends between the root region and the tip region along a region of the membrane which is generally equidistant between the leading and trailing edges.

4. The turbomachine fan blade preform according to claim 3 wherein the second region extends along at least a portion of the length of the first region, on each respective side of the first region.

5. The turbomachine fan blade preform according to claim 3 wherein the first region includes a first sub-region extending along a generally central region of the membrane between the root region and the tip region, and a second sub-region extending laterally between the leading edge region and the trailing edge region.

6. The turbomachine fan blade preform according to claim 5 wherein the second sub-region is closer to the root portion than to the tip region.

7. The turbomachine fan blade preform according to claim 1 further including a tapered region provided at each border between the first and second regions, the thickness of the tapered region being configured to provide a transition between the respectively different thicknesses of the first and second regions.

8. The turbomachine fan blade preform according to claim 1 wherein a surface of the membrane is substantially planar, for planar engagement with a corresponding planar surface of a panel of said panels.

9. A method of manufacture of a turbomachine fan blade, the method comprising:
   providing a fan blade preform according to claim 1;
   performing a bonding process to bond the panels and the membrane at selected regions;
   performing a hot forming process on the fan blade preform to provide an internal cavity across which the membrane extends.

10. The method according to claim 9, wherein the bonding process is a diffusion bonding process.

11. The method according to claim 9, wherein the hot forming process is a superplastic forming process.

12. A turbomachine fan blade comprising
   a pair of mutually opposing fan blade skins, arranged to extend between leading and trailing edges of the fan blade and between root and tip portions of the fan blade to define an internal cavity, and
   an internal membrane spanning the cavity between the respective skins, and extending at least partway between the root and tip portions; wherein:
   a thickness of at least a portion of the membrane tapers along its length between the root and tip portions, from a relative thicker first region to a relatively thinner second region,
   the thickness of the membrane in the first region is greater than the thickness of the membrane in the second region by more than 10% of the thickness of the second region,
   the fan blade includes a root region and a tip region, and a leading edge region and a trailing edge region, the membrane extends between root and tip regions and between the leading edge and trailing edge regions, and
   the first region of the membrane is located proximate the root region, and the second region of the membrane is located distal to the root region.

13. The turbomachine fan blade according to claim 12 wherein the thickness of the membrane in the first region is greater than the thickness of the membrane in the second region by more than 25% of the thickness of the second region.

* * * * *